United States Patent [19]

Souslin

[11] 4,048,905
[45] Sept. 20, 1977

[54] VARIABLE ORIFICE HYDRAULIC SNUBBER

[75] Inventor: Richard Ervin Souslin, Seattle, Wash.

[73] Assignee: The Boeing Company, Seattle, Wash.

[21] Appl. No.: 671,633

[22] Filed: Mar. 29, 1976

[51] Int. Cl.² .................. F15B 15/22; F01B 11/02
[52] U.S. Cl. .................................. 91/405; 91/422;
    92/85B; 188/284; 188/316
[58] Field of Search ............. 91/416, 395, 394, 405,
    91/392, 406, 401, 399, 422; 92/10, 85 B, 143;
    188/284, 285, 288, 316

[56] References Cited

U.S. PATENT DOCUMENTS

| | | | |
|---|---|---|---|
| 1,143,753 | 6/1915 | Fernanzo | 188/288 |
| 1,216,221 | 2/1917 | Erickson et al. | 188/288 |
| 1,503,881 | 8/1924 | Bros | 188/316 |
| 1,845,167 | 2/1932 | McGrew | 188/316 |
| 3,229,589 | 1/1966 | Langas | 91/416 |
| 3,835,753 | 9/1974 | Bunyard | 91/394 |

FOREIGN PATENT DOCUMENTS

| | | | |
|---|---|---|---|
| 714,881 | 8/1965 | Canada | 92/85 B |

Primary Examiner—Paul E. Maslousky
Attorney, Agent, or Firm—Glenn Orlob; Bernard A. Donahue

[57] ABSTRACT

This invention is a piston-cylinder hydraulic snubbing device to arrest or resist motion. The invention may be utilized as a snubbing device alone, or it may be incorporated into a hydraulically actuated piston-cylinder assembly. The principal feature is that an orifice, through which hydraulic fluid is forced, is in the form of a gap between the ends of a piston ring, which gap is varied by engagement of the ring with a tapered bore in the cylinder.

2 Claims, 6 Drawing Figures

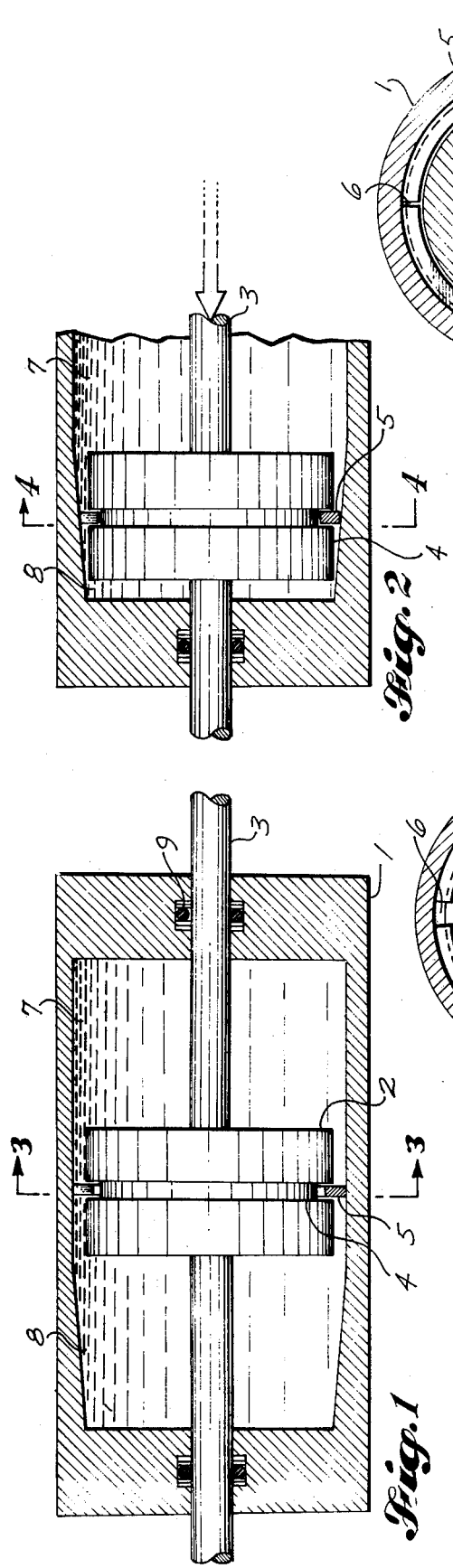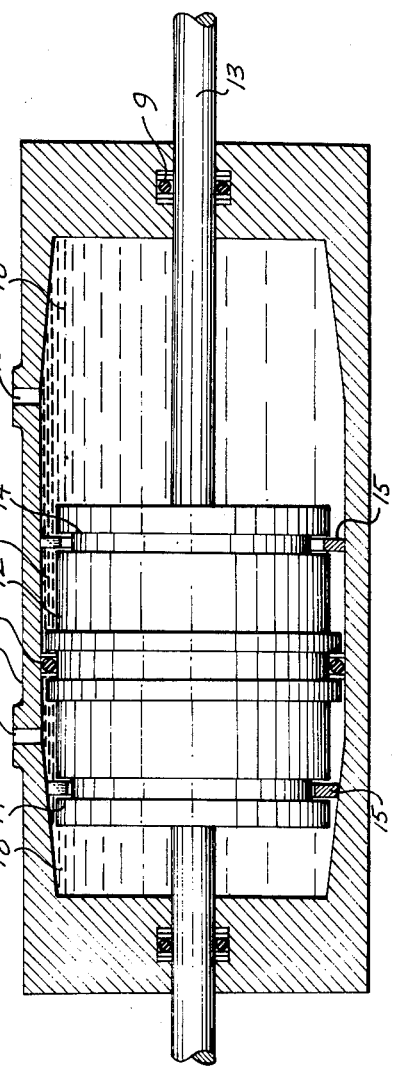

VARIABLE ORIFICE HYDRAULIC SNUBBER

The invention described herein may be manufactured and used by and for the U.S. Government for governmental purposes without the payment of any royalty thereon.

BACKGROUND OF THE INVENTION

A common problem in mechanisms is to arrest or resist rectilinear motion of mechanical parts, and a common solution is a piston-cylinder assembly having a restricted passage from one side of the piston to the other. It is frequently desirable to provide some means of varying the restriction with the position of the piston along its stroke; by this means the resistance to motion can be tailored to achieve desired values as functions of velocity and position of the piston with respect to the cylinder. Many arrangements for achieving an orifice variable with piston position have been developed, the most common perhaps, involving a circular orifice in the piston through which passes a tapered rod attached to the cylinder, often used in aircraft landing gear shock struts. Other devices may incorporate grooves of varying depth in the cylinder wall (U.S. Pat. No. 695,775), tapered cylinders in which a fixed diameter piston operates (U.S. Pat. No. 3,062,331), or more or less complex valves in the passage.

The objectives sought and achieved by the present device include simplicity of manufacture, ease of altering the resistance characteristics, ready adaptability to incorporation into relatively complex actuating mechanisms, low cost, and trouble-free operation.

DESCRIPTION OF THE DRAWINGS

FIG. 1 is a view, partly sectioned, and somewhat diagrammatic, of a piston-cylinder snubbing mechanism incorporating this invention.

FIG. 2 is a fragmentary view, similar to FIG. 1, with the parts in different relative positions.

FIG. 3 is a transverse section on line 3—3 of FIG. 1.

FIG. 4 is a transverse section on line 4—4 of FIG. 2.

FIG. 5 is a view, similar to FIG. 1, illustrating a piston-cylinder actuator assembly provided with the snubbing arrangement of this invention.

FIG. 6 is a view, similar to FIG. 5, illustrating another embodiment.

DESCRIPTION OF THE INVENTION

The device of FIG. 1 is a simple motion-snubbing device having no actuating capability. It consists of a cylinder 1, a piston 2 provided with a piston ring 5 in a piston-ring groove 4, and a piston rod 3. (In the diagrammatic drawings, the cylinder is shown as a single element, but in actual equipment the cylinder must be made in several parts to permit assembly, as is common practice.) The piston rod 3 is sealed to the cylinder by a conventional seal 9.

The cylinder bore has a portion 7 of uniform diameter, and a second portion 8, adjacent the left end, tapering to a smaller diameter. (The amount of taper is exagerated for clarity.) The piston ring 5 is of such circumference that, when engaged within the uniform diameter portion 7 of the cylinder, a predetermined gap 6 exists between its ends, as shown in FIG. 3. This gap 6 forms the orifice through which fluid must pass as the piston moves relative to the cylinder, thereby causing desired resistance to motion. It will be obvious that the effective area of this gap may easily be modified by modification of the ring circumference or by substitution of a different ring of different length. This makes it easy and cheap to modify the snubbing characteristics of the device without modification of major parts.

It will be apparent that, as the piston moves to the left, the piston ring 5 encounters the tapered portion 8 of the cylinder bore, the ring is forced to contract, and the gap 6, and hence the area of the orifice it constitutes, decreases. This is shown in FIGS. 2 and 4.

Thus, the fluid trapped between the piston ring and the closed end of the cylinder can escape only through the gap 6 which, in the form shown, becomes progressively smaller as the piston moves farther to the left. The configuration as shown is designed primarily to dampen or snub motion of the piston toward the left. Typically, such action is required on devices such as aircraft landing gears, which drop when extended, requiring energy dissipation, whereas the snubbing on the return stroke is relatively unimportant.

FIG. 5 illustrated the invention applied to a piston-cylinder assembly for actuation of a mechanism. Here the piston 12 is provided with a seal 21 and the cylinder is provided with ports 20 on either side thereof, so that as fluid is admitted to one port 20 and exhausted from the other, motion is transmitted by rod 13 to any desired mechanism, as is well known. The cylinder bore is of uniform diameter in its central region 17, in which the seal 21 operates, and tapered in diameter at both end regions 18. The piston 12 is elongated on both sides of the seal 21, and is provided with a groove 14 adjacent each end, each provided with a ring 15. The cooperation of the rings 15 with the tapered cylinder bore portions 18 is the same as that of the rings 5 with bore portions 8, as previously described in connection with FIGS. 1 through 4. Thus, the motion of the piston 12 within the cylinder 11 is smoothly arrested as the piston reaches the end of its stroke in either direction.

In FIG. 6 is illustrated an embodiment in which the tapered "cylinder" is within the principal piston, while the cooperating piston and ring are attached to the cylinder head. Thus, the arrangement is essentially the reverse of that previously described. In this form, the cylinder 31 is of uniform bore throughout, to cooperate with the piston 32 in the usual fashion. The damping or snubbing arrangement comprises a cylindrical extension 40 projecting axially and inwardly from the head of the cylinder, and carrying a piston ring 35 similar to that previously described. This piston ring cooperates with a tapered (frustoconical) recess 38 in the principal piston 32. Thus, as the piston 32 approaches the left end of the cylinder, the extension 40, carrying the ring 35, enters the recess 38, trapping fluid which must escape through the gap in ring 35. This gap, of course, varies as the ring 35 travels within the tapered recess 38, becoming less as the piston 32 approaches the left end of its stroke.

I claim:

1. A piston and cylinder assembly comprising:
   a cylinder having a closed end, the internal diameter of said cylinder increasing, over a portion of the length, with distance from said closed end;
   a piston movable in said cylinder, said piston being provided with an annular piston-ring groove;
   a piston ring in said groove and in contact with said cylinder having a circumference such that its ends form an opening therebetween, which opening is determined by the diameter of said cylinder with which the ring is in contact.

2. A hydraulic snubbing arrangement comprising relatively reciprocal parts, one of which has a closed-end chamber of circular cross-section and of nonuniform diameter; the second of which is of circular cross-section and is arranged to enter said chamber, and which is provided with an annular groove; and a piston ring in said groove, said ring having a gap between its ends providing for escape of fluid from said chamber.

* * * * *